No. 840,177. PATENTED JAN. 1, 1907.
F. THÜRRID.
PLOW AND SEEDER.
APPLICATION FILED OCT. 1, 1906.
2 SHEETS—SHEET 1.
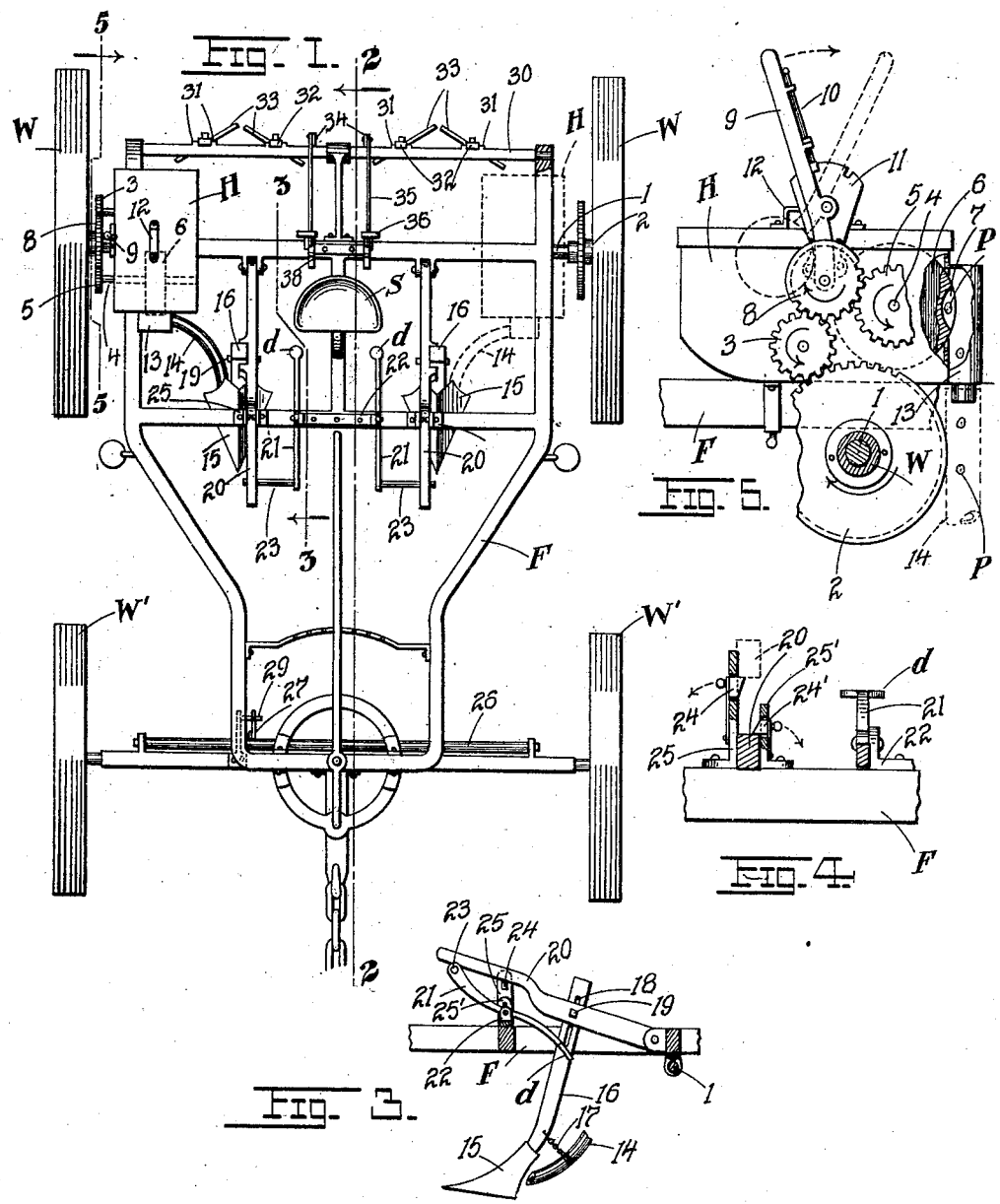
WITNESSES:
INVENTOR.
Frank Thürrid
BY
ATTORNEY.

No. 840,177. PATENTED JAN. 1, 1907.
F. THÜRRID.
PLOW AND SEEDER.
APPLICATION FILED OCT. 1, 1906.
2 SHEETS—SHEET 2.
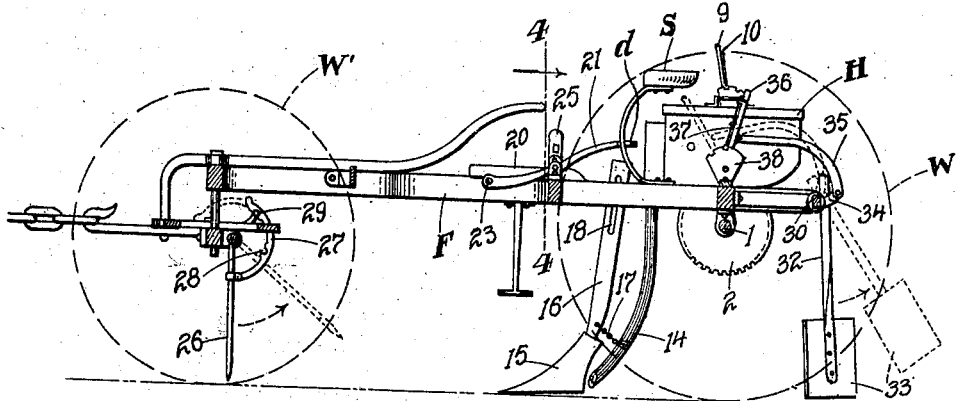
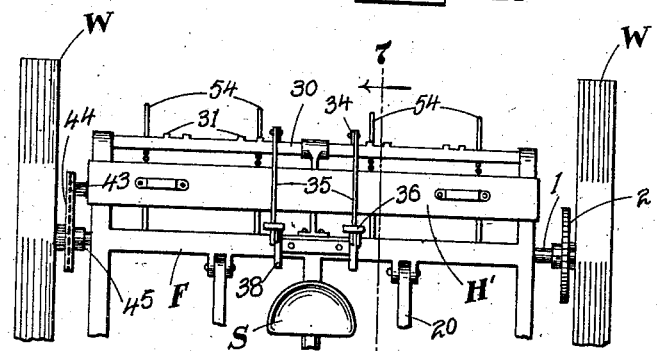
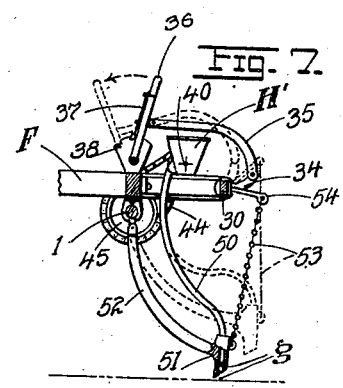
WITNESSES:
INVENTOR.
Frank Thürrid
BY
ATTORNEY.

UNITED STATES PATENT OFFICE.

FRANK THÜRRID, OF ST. LOUIS, MISSOURI.

PLOW AND SEEDER.

No. 840,177. Specification of Letters Patent. Patented Jan. 1, 1907.

Application filed October 1, 1906. Serial No. 336,908.

*To all whom it may concern:*

Be it known that I, FRANK THÜRRID, a citizen of the United States, residing at St. Louis, in the State of Missouri, have invented certain new and useful Improvements in Plows and Seeders, of which the following is a full, clear, and exact description, reference being had to the accompanying drawings, forming a part hereof.

My invention has relation to improvements in plows and seeders; and it consists in the novel construction and arrangement of parts more fully set forth in the specification and pointed out in the claims.

In the drawings, Figure 1 is a top plan of the machine. Fig. 2 is a longitudinal vertical section on line 2 2 of Fig. 1. Fig. 3 is a section on line 3 3 of Fig. 1. Fig. 4 is a transverse vertical section on line 4 4 of Fig. 2. Fig. 5 is a vertical section on line 5 5 of Fig. 1. Fig. 6 is a top plan of the rear end of the machine, showing a modified form of hopper and driving mechanism therefor. Fig. 7 is a vertical section on line 7 7 of Fig. 6. Fig. 8 is an enlarged end view of the hopper and driving-gear therefor. Fig. 9 is a rear view of Fig. 8, and Fig. 10 is a sectional detail on line 10 10 of Fig. 9.

The present invention is an improvement on the construction of plow and seeder shown in my United States Letters Patent No. 823,374, dated June 12, 1906, and has for its object a material simplification of the details of the old machine and the introduction of other details which will make the machine readily convertible from a potato-planter to a seed-planter.

The advantages of the present improvement will be better apparent from a detailed description of the invention, which is as follows:

Referring to the drawings, and for the present to Figs. 1 to 5, inclusive, F represents the machine-frame; W, the rear wheels; 1, the axle therefor, and W' the front wheels thereof. Secured to the hub of each wheel W is a gear-wheel 2, which meshes with a pinion 3 on the outside of a feed-hopper H, mounted on the frame, the said hopper being provided with a front transverse shaft 4, whose outer end carries a pinion 5, the center of the shaft being provided with a feed-disk 6, having one or more peripheral pockets 7, as shown. The pinions 3 and 5 are adapted to be brought into engagement through the medium of an intermediate pinion 8 at the end of the short arm of a controlling-lever 9, pivoted on the outside of the hopper and provided with a sliding pawl 10, of conventional and well-known design, for locking the lever in any predetermined position along the rack-plate 11, secured to the side of the hopper, Fig. 5. The hopper is provided with a lid or cover having a handle 12 for lifting it off and replacing it again.

As shown in the full position of the parts in Fig. 5, the train of pinions 3 8 5 are in mesh, so that as the machine is drawn along the ground and rotation imparted to the gear-wheel 2 motion of rotation will be imparted to the shaft 4 and feed-disk 6, the potatoes P being scooped up by the pockets 7 and at the proper moment ejected or allowed to drop out of the open side of the hopper into a chamber or compartment 13, from the bottom of which leads a flexible or rubber conducting hose or tube 14, which delivers the potato into the furrow left by the plowshare 15, to the stem 16 of which it is coupled by a chain 17, Fig. 3.

The stem or shank 16 of the share is provided with a longitudinal slot 18, by means of which it may be accurately adjusted according to the depth of furrow to be plowed and when once adjusted is secured in position by a bolt 19 to a supporting-arm 20, pivoted at its rear end to the frame F and adapted to oscillate in a vertical plane. This arm can be raised, so as to lift the share off the ground by means of a foot-lever 21, pivoted to a bracket 22, the forward end of the lever being provided with a laterally-projecting pin or arm 23, which engages the under surface of the free end of the arm 20. The driver by placing his foot on the pedal end of the lever depresses said end and raises the forward end, thus lifting the free end of the arm 20 sufficiently to raise the share 15 off the ground, Fig. 3. In this position the parts may be locked, the arm 20 in such upward movement riding freely over the bevel-face of a spring-catch or locking-latch 24 of well-known construction secured to a bracket 25, the head of the latch springing under the arm and arresting its downward movement. It may be released at any time and allowed to drop to its lowest position by pulling the catch away, as shown by curved arrow in Fig. 4, when the arm may in turn be locked in its lowest position by a similar spring-catch 24', (secured to a bracket 25',) from which it may in turn be released by a withdrawal of the latch, as shown by the arrow in Fig. 4, all as clearly understood in the art.

Suspended from the front of the frame F is a harrow 26, at a suitable point of which is secured a curved spring-arm 27, whose inner edge is provided at suitable intervals with notches 28, adapted to engage a pin or arm 29, secured to the frame F, so that the harrow can be locked to operative position, as shown in Fig. 2, or be swung to disengaging position, as shown by dotted position of the parts in the same figure.

To cover up or close the furrow after the planting operation, I make the following provision: Disposed at the rear of the frame F is a rocker-bar 30, having disposed at proper intervals pairs of lugs 31 31, between which may be adjustably and rigidly bolted the arms or standards 32, whose lower ends carry the diagonally-disposed scrapers or blades 33. These scrapers being disposed in pairs cover up the furrow left by the plowshare after the planting is complete and may be locked in operative or inoperative position as follows: Secured pivotally to short arms or lugs 34, projecting outwardly from the rocker-bar 30, are curved links 35, the front ends of which are pivotally coupled to the lower ends of the vertical levers 36, pivoted to the frame on either side of the center line of the seat S, each lever being provided with a sliding pawl 37 and rack-plate 38, similar to the lever 9 and pawl 10, described in connection with the feed-hopper mechanism and well understood in the art. It will be seen that by oscillating the levers 36 in proper direction the rocker-bars 30 can be rocked in proper position to throw the scrapers into engagement with or out of engagement with the ground. (See both positions in Fig. 2.)

The operation is readily apparent from the description as given. The gears 3 8 5 being in engagement the forward movement of the machine-frame imparts rotation to the feed-disk 6, which carries the potatoes through the tubes 14 into the furrows opened by the shares 15, when the furrows are covered up by the scrapers 33. To stop the planting operation, the pinion 8 is disengaged by throwing the lever 9 rearward, (see dotted position, Fig. 5,) when no rotation can be imparted to the feed-disk. In drawing the machine home after a day's work the harrow, the plows, and the rakes or coverers can all be raised off the ground and locked in position, as already described.

The modifications shown in Figs. 6 to 10, inclusive, show a provision for substituting a hopper H' for planting grain or seed in lieu of potatoes. This hopper is disposed across the rear of the machine-frame, as shown, Fig. 6, being provided with a central longitudinal shaft 39, carrying agitating-blades or agitators 40. The outer end of this shaft is provided with a pinion 41, which meshes with a pinion 42, formed on the hub of a sprocket-wheel 43, from which leads a sprocket-chain 44 to a sprocket-wheel 45, secured to the hub of the adjacent wheel W. Meshing likewise with the pinion 42 is a pinion 46 at the end of a feed-shaft 47, mounted at the base of the outside of the rear of the hopper H', said shaft being provided at intervals with star feed-disks 48, located in a chamber 49, from which chamber leads the rubber or other flexible feed-hose 50 to a hollow shoe or share 51, through which the seed falls into the furrow formed by the shoe. The shoes 51 are carried at the ends of the arms 52, pivotally suspended from the axle 1, Fig. 7, and the shoes can be lifted off the ground by drawing on the chains 53, which are secured, respectively, to the shoes and to arms 54, projecting from the rocker-bar 30, which latter, as seen, is actuated by the levers 36 and pawls 37, previously referred to. The rear of each compartment 49 is controlled by a sliding gate 55, which may be adjusted to allow more or less quantity of the seed to escape from the hopper H'.

Where the modified hopper H' and the specific gearing for discharging the seed or grain g is substituted for the potato-planter or hopper H, the shares 15 are thrown out of commission, the furrowing being accomplished by the shoes 51.

The manner of operation of the ejecting devices 48 for the seed is apparent from the gearing illustrated in Figs. 8 to 10 and needs no special description.

Having described my invention, what I claim is—

1. In a plow and seeder, a suitable frame, rear bearing-wheels for the same, a hopper adjacent to either wheel, a gear-wheel coupled to the bearing-wheel, a pinion meshing with said gear-wheel, a plowshare, a conveying tube or hose leading from the hopper to a point in the rear of the plowshare, a controlling-lever, devices within the hopper for delivering the contents of the hopper to said conveying-tubes, and an intermediate gear carried by the lever for completing the train of gears between the aforesaid pinion and said delivering devices, upon an oscillation of the lever in one direction, substantially as set forth.

2. In a plow and seeder, a suitable frame, rear bearing-wheels for the same, a hopper adjacent to each wheel, a gear-wheel coupled to each bearing-wheel, a pinion meshing with said gear-wheel, a plowshare, a conveying tube or hose leading from the hopper to a point in the rear of the share, a controlling-lever, a feed-disk having peripheral pockets confined within the hopper for delivering the contents of the hopper to said conveying-tubes, a pinion on the outer end of the feed-disk shaft, a pinion on the end of one arm of the controlling-lever adapted to be thrown into mesh with the aforesaid pinions for imparting motion to the feed-disk upon advance of the machine over the ground, and means for locking the lever in its engaged or disengaged position, substantially as set forth.

3. In a plow and seeder, a suitable frame, a plowshare therefor, means for conveying the seed to a point behind the share, an oscillating arm pivoted to the frame and carrying the share, a pedal-lever pivoted at an intermediate point of its length and having one end in coöperative relation with the free end of the oscillating arm whereby upon depression of the opposite end of the pedal-lever the end engaging the oscillating arm is raised, thereby raising the arm and elevating the plowshare, and means for locking the pedal-lever in either of its extreme positions, substantially as set forth.

4. In a plow and seeder, a frame having a front harrow, plowshares in the rear of the harrow, means for delivering the seed to the furrow made by the shares, a rear rocker-bar on the frame, means for rotating said bar, a series of arms arranged in pairs depending from said rocker-bar in the path of the furrow receiving the seed, and scrapers or blades set at an incline to one another whereby the furrow is covered up in the passage of the blades thereover, and means for throwing the blades out of engagement with the ground, substantially as set forth.

In testimony whereof I affix my signature in presence of two witnesses.

FRANK THÜRRID.

Witnesses:
EMIL STAREK,
MARY D. WHITCOMB.